United States Patent [19]

Hoglund et al.

[11] 4,005,552
[45] Feb. 1, 1977

[54] APPARATUS FOR IMPROVED CONTROL OF A GRINDING MACHINE

[75] Inventors: Nils O. Hoglund, Short Hills; Carl Hoglund, Murray Hill, both of N.J.

[73] Assignee: Tri-Ordinate Corporation, Berkeley Heights, N.J.

[22] Filed: Oct. 21, 1974

[21] Appl. No.: 516,396

[52] U.S. Cl. .......................... 51/101 R; 51/165.72; 51/DIG. 32
[51] Int. Cl.² .................. B24B 17/06; B24B 19/00
[58] Field of Search ..... 51/101 R, DIG. 32, 165.72, 51/165.86

[56] References Cited
UNITED STATES PATENTS

| | | | |
|---|---|---|---|
| 1,693,723 | 12/1928 | Mitchell | 51/165.86 X |
| 3,663,188 | 5/1972 | Hoglund | 51/101 R |
| 3,816,996 | 6/1974 | Uhtenwoldt | 51/101 R |
| 3,834,084 | 9/1974 | Sakane et al. | 51/101 R |
| 3,851,422 | 12/1974 | Dojyo et al. | 51/DIG. 32 |
| 3,866,360 | 2/1975 | Monajjem | 51/165.72 X |

OTHER PUBLICATIONS

Trial Voluntary Protest Program Published Application B318,745 to Seidel.

*Primary Examiner*—Harold D. Whitehead
*Assistant Examiner*—Nicholas P. Godici
*Attorney, Agent, or Firm*—Pennie & Edmonds

[57] ABSTRACT

A method and apparatus are described for modifying the operation of a grinding machine in accordance with the angular position of a workpiece being ground. In addition to conventional apparatus, the improved apparatus comprises means for sensing the angular position of the workpiece with respect to a grinding tool, a memory device for producing output signals when the workpiece is at at least one predetermined angular position and means for adjusting at least one of the position of the grinding tool, the speed of the grinding tool, the lateral movement of the grinding tool across the workpiece, and the speed at which the workpiece is moved in response to said output signals as the grinding tool is being fed into the workpiece.

31 Claims, 4 Drawing Figures

APPARATUS FOR IMPROVED CONTROL OF A GRINDING MACHINE

BACKGROUND OF THE INVENTION

This is concerned with an improved method and apparatus for controlling a grinding machine. It is particularly useful with cam-controlled machines used in grinding rotary combustion engines of the Wankel type, such as described in U.S. Pat. No. 3,663,188 to Nils O. Hoglund, which is hereby incorporated by reference. Conventional grinding machines include a worktable for mounting a workpiece to be ground, a grinding wheel, and means for moving the worktable so that the workpiece is moved past the grinding wheel. In cam-controlled grinding machines, the worktable is fixed relative to a cam member so that the workpiece is moved through a path corresponding to the contoured surface of the cam member by rotation of a drive means that engages the contoured surface of the cam.

In grinding the complicated epitrochoid shape of the combustion chamber of a Wankel engine, the relatively thin-walled casting tends to act like a rubber band. Moreover, the thickness of the wall varies because of the arrangement of cooling channels behind the chamber walls; and port openings permit springback and have the effect of an interrupted cut. Since internal and external grinding conditions are present on the same surface, a relatively heavy cut may be made when grinding an external contour, such as the waist section of the chamber, since the grinding wheel contact area is relatively small and the unit grinding pressure is high. Conversely, when grinding an internal contour, such as those at the long ends of the epitrochoid, the grinding wheel contacts area becomes relatively large and the unit pressure decreases, making for a smaller cut. As a result, there are continuously varying amounts of workpiece distortion all along the grinding path and coming to accurate sizes under these conditions is a real problem. Even when an in-process gauging system is used for sparkout control, this only indicates that one point along the contour has come to size. Because of springback and distortion, this does not indicate that any other part of the rubber-band-like part has come to size.

SUMMARY OF THE INVENTION

To eliminate these problems a method and apparatus have been devised for modifying the operation of a grinding machine in accordance with the angular position of the workpiece. In addition to conventional apparatus, the improved apparatus comprises means for sensing the angular position of the workpiece with respect to a grinding tool, a memory device for producing output signals when the workpiece is at at least one predetermined angular position and means for adjusting at least one of the position of the grinding tool, the speed of the grinding tool, the lateral movement of the grinding tool across the workpiece, and the speed at which the workpiece is moved in response to said output signals as the grinding tool is being fed into the workpiece.

In one embodiment of the invention the improved apparatus comprises a program track running along the periphery of a worktable on which the workpiece is mounted. The program track comprises several rows of tapped holes in which tripdogs may be selectively mounted to identify angular positions for which adjustments are to be made in the position of the grinding tool. Sensing apparatus comprising one limit switch per row is positioned over the rows of holes so that the limit switches may be tripped as the tripdogs pass beneath the apparatus. Output signals from the sensing apparatus are then used to adjust the position or speed of the grinding tool as it is being fed into the workpiece in accordance with the number and/or radial position of the tripdogs.

In still another embodiment, the angular position of the cam may be sensed by a photoelectric device mounted in line with the point at which the cam drive drives the cam or the point at which the grinding tool engages the workpiece. Although the epitrochoid shape of the cam moves the worktable laterally in the course of following the cam, the point of contact between the cam drive and the cam and between the grinding wheel and the workpiece is fixed in space. Hence, the angular position of the cam, the workpiece, and the worktable may be sensed at either of these locations by any appropriate means. In the preferred embodiment of the invention, light is reflected off the bottom of the worktable and changes in the amount of light reflected from spots painted on the bottom of the worktable are used to indicate the position of the worktable, the workpiece, and the cam.

These and other objects, features and elements of our invention will be more readily apparent from the following detailed description of the drawing in which.

DETAILED DESCRIPTION OF THE DRAWING

Figure 1:
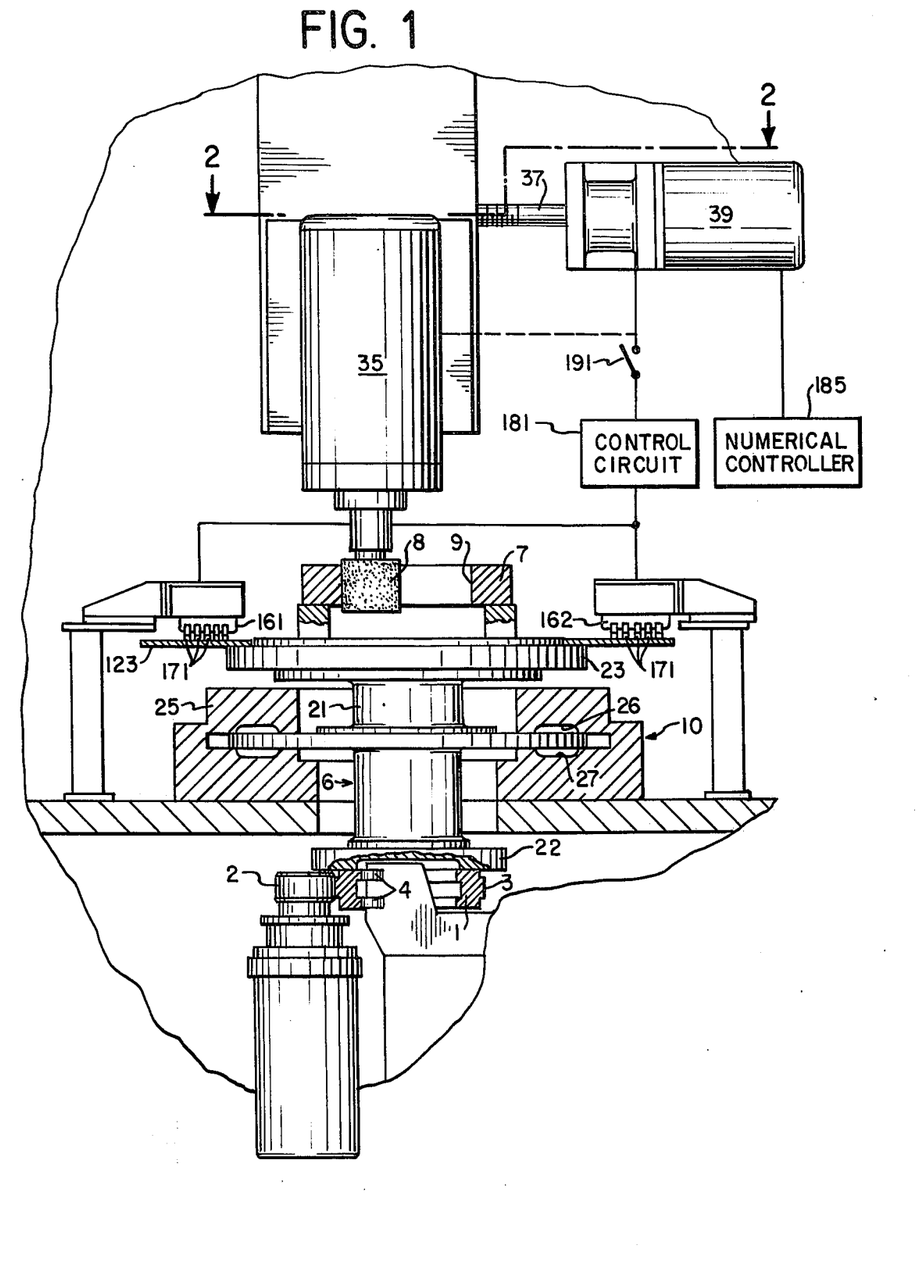
FIG. 1 is a schematic view of illustrative grinding apparatus of the present invention.

The grinding apparatus of the present invention is shown in FIG. 1 mounted on prior art apparatus similar to that in FIGS. 1 and 5 of U.S. Pat. No. 3,663,188. Elements bearing numerals less than 100 have corresponding elements shown in U.S. Pat. No. 3,663,188. As shown in FIG. 1, the grinding apparatus comprises a cam drive 2 which engages external surface 3 of an annular cam member 1 and a cam guide follower means 4 that engages tracks 15 and 16 on its internal surface to urge it into contact with cam drive 2. Support means 6 are provided for mounting the cam member 1 at one end thereof and for holding a workpiece 7 at the other end. A grinding wheel 8 driven by motor 35 engages internal surface 9 of the workpiece. The grinding wheel is fed into the workpiece by a stepping motor 39 that drives lead screw 37.

To permit movement of the cam member along a path corresponding to surface 3, support means 6 is mounted within bearing means 10. Support means 6 and bearing means 10 comprise a spindle 21 having at its lower end a support 22 to which cam member 1 is bolted and at its upper end a support 23 to which workpiece 7 is attached for grinding. Spindle 21 is free to rotate about its longitudinal axis and is also free to move laterally during its rotation along a path dictated by the external surface 3 of the cam member. For this purpose spindle 21 includes a circular bearing plate 24 attached to the spindle intermediate its ends. The peripheral portion of the bearing plate is disposed within a housing 25 that includes a plurality of upper and lower pockets 26 and 27 facing the opposite sides of the bearing plate.

The apparatus shown in FIG. 1 differs from that shown in U.S. Pat. No. 3,663,188 in that cam drive 2 is positioned to engage the external surface of the cam member while the cam guide follower means 4 engages tracks on the internal surface and hydraulic pressure rather than air pressure is used to float bearing plate 24 within bearing means 10. At present, these features are preferred over those shown earlier in U.S. Pat. No. 3,663,188.

In accordance with the present invention the grinding machine of FIG. 1 is equipped with a programming table 123 that is rigidly coupled to spindle 6 and extends well beyond the outer edge of the workpiece being ground. About the periphery of worktable 123 are several rows of tapped holes 150 into which tripdogs 151 may be fitted. Above the periphery of worktable 123 in a position to be activated by tripdogs 151 are two sets 161 and 162 of limit switches 171. Each limit switch 171 is positioned so as to be tripped by a tripdog located in one of the rows beneath it. The limit switches produce a signal that is a function of the number and/or radial position of the tripdogs that activate them. This signal is applied through control circuit 181 to stepping motor 39 to adjust the position of grinding wheel 8 as it is being fed into workpiece 7. Thus the signal from control circuit 181 acts to modify the action of the stepping motor which ordinarily feeds the grinding wheel into the workpiece at the rate of some specified distance per grinding cycle (i.e., revoluton of the workpiece). The ordinary feed rate of the stepping motor may, for example, be controlled by a small digital computer which acts as a numerical controller 185. A switch (not shown) in the power supply to switches 171 and/or a switch 191 in the circuit from switches 171 to stepping motor 39 can be used to disconnect the stepping motor from control by the limit switches. Thus, the position of the tripdogs on programming table 123 can be set up in advance of the entire grinding operation; and switches 171 can be disconnected during rough grinding and then connected during final grinding by closing the appropriate power supply switches and/or switch 191.

Figure 2:
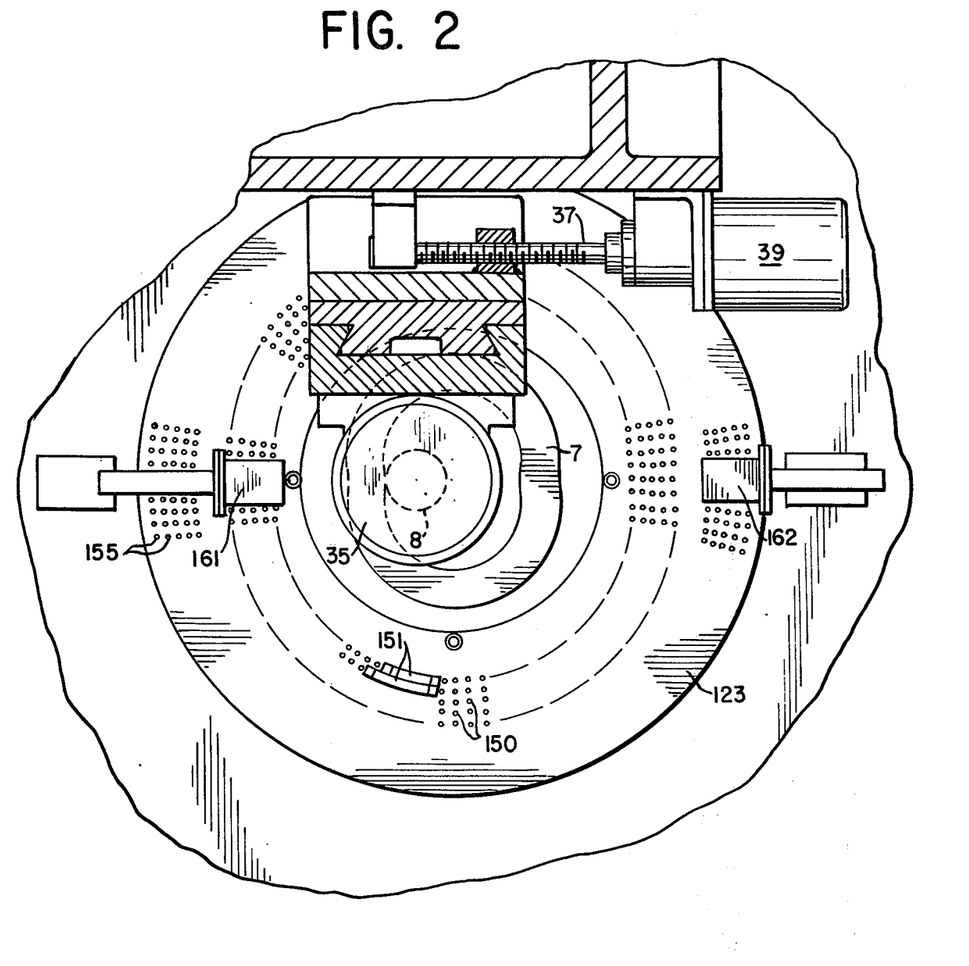
FIG. 2 is a cross-sectional view of the grinding apparatus as viewed from the plane identified by lines 2—2 of FIG. 1.
Figure 3:
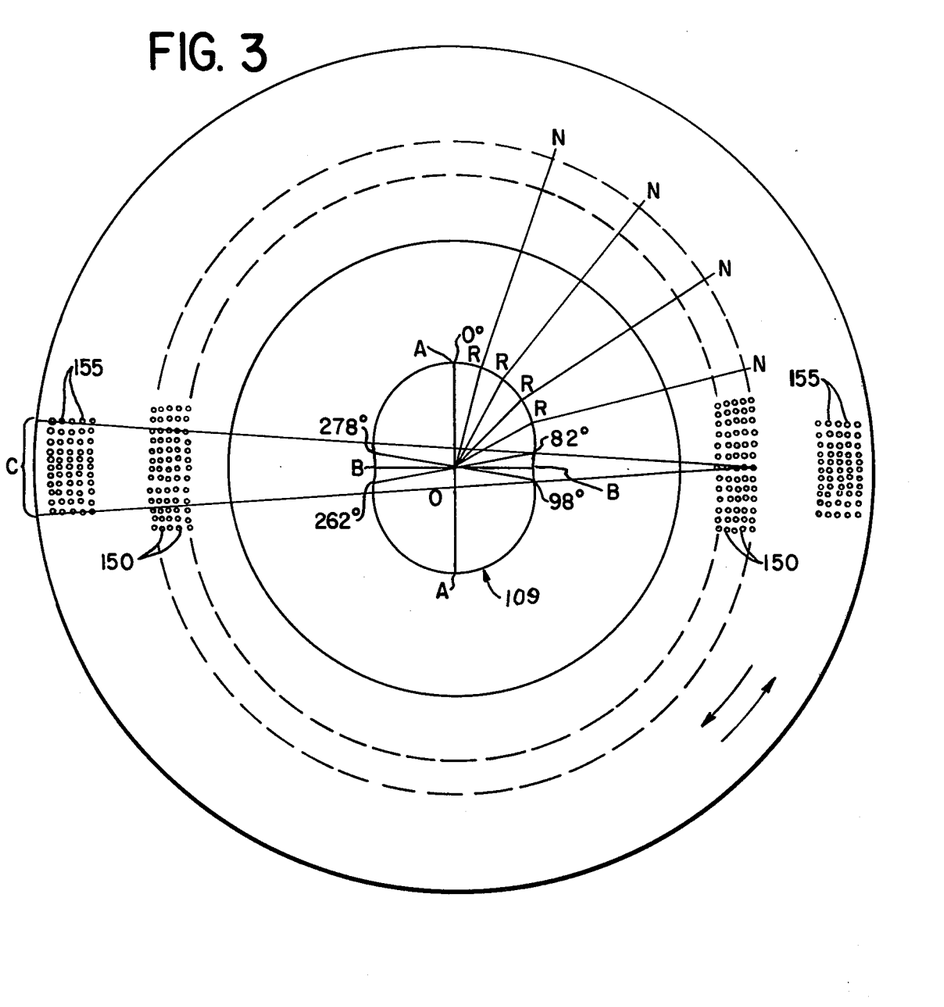
FIG. 3 is a top plan view showing details of the apparatus of FIG. 1.

In the embodiment shown in FIGS. 1-3 five rows of tapped holes 150 are formed in the periphery of programming table 123. These five rows define five closed paths one inside the other that are parallel to one another in the sense that the distance between any two paths along the normal between the paths is approximately constant throughout the path. In the same sense, as shown in FIG. 3, these paths are parallel to a projection 109 in the plane of the programmed table of the epitrochoid contour into which workpiece 9 is being ground. Since the programming table is only used to control the position and/or speed of the grinding wheel when the contour of workpiece 9 approximates the epitrochoid, the distance between the contour being ground and each of the rows of holes 150 is approximately constant throughout the grinding of the entire contour.

Illustratively, each row of holes 150, except the innermost whose function is described below, is assigned a value of 0.2 mils so that the presence of a tripdog 151 in one row at a given angular position produces a change in position of the grinding wheel of 0.2 mils and the presence of tripdogs in two, three and four rows produce a change in position of 0.4, 0.6 or 0.8 mils, respectively. Alternatively, the significance of each row can be weighted in binary fashion so that the presence of a tripdog in, for example, the next innermost row produces a 0.1 mils change, the presence of a tripdog in the second row a 0.2 mils change, in the third row A 0.4 mils change and so on. In the first instance the signal produced and the resulting change depends on the number of tripdogs at a given angular position. In the latter instance the signal produced and the resulting change depends on both the number and the radial position of the tripdogs at a given angular position.

Similar control can be exercised over the speed of grinding wheel 8 by using signals from switches 161, 162 to control the speed of motor 35; and, if desired, some rows of holes may be used to control the position of the grinding wheel while other rows control the speed.

Two sets 161, 162 of limit switches are used in the embodiments of FIGS. 1-3 to provide control over the position of the grinding wheel and/or its speed throughout the grinding cycle. These two sets are aligned on opposite sides of the programming table in approximately the same plane as the point of contact between the grinding wheel and the workpiece. When internal contours are being ground, holes 150 and switch set 161 control the position and/or speed of the grinding wheel. However, as is known in the art, during the grinding of each external contour of the workpiece the direction of motion of the worktable and therefore the programming table reverses itself twice. It is therefore necessary to supplement the controls provided by tapped holes 150 and switch set 161 with a second set of several rows of tapped holes 155 and switch set 162. Just as switch sets 161, 162 are on opposite sides of the programming table in the embodiment shown in FIGS. 1-3 so too second set of holes 155 is located on the opposite side of the programming table from each external contour.

The use of the second set of holes 155 may be understood from FIG. 3. For easy reference and convenience of description, the intersection of the major and minor axes AOA, BOB of element 109 is assumed to be the center of a circle and radial lines OR are drawn from this center to their intersection with projection 109. From projection 109, normal lines RN are drawn extending as far as the closed paths defined by holes 150. As will be evident, in the region of the waist of the epitrochoid normal lines cannot be drawn between projection 109 and the paths defined by holes 150. For the system shown in FIG. 3, the angular position of this waist is from approximately 82° to 98° and from approximately 262° to 278°. It is in this region of the waist that the external contour is ground requiring the direction of movement of the worktable to reverse itself twice.

Since the cam control operates to keep the grinding wheel normal to the contour being ground, normal lines RN depict the relative orientation of the grinding wheel with respect to the workpiece and the programming table. By projecting these normal lines back to the other side of the programming table, it can be seen how the motion of the programming table doubles back on itself. If the general direction of travel of the workpiece and the programming table is counterclockwise in FIG. 3, the motion of the table will sweep out sector C once when the table is traveling counterclockwise in the angular range of approximately 60° to 80°, a second time when it is traveling clockwise in the angular range of 82° to 98°, and a third time when it is traveling counterclockwise in the angular range of 100° to 120°.

During the first and third sweeps of sector C, any adjustments required in the position and/or speed of grinding wheel 8 are controlled by tripdogs mounted in holes 150. During the second sweep when the external contour is ground tripdogs mounted in holes 155 and sensed by switch set 162 control the position and/or speed of the grinding wheel. In order to activate switch set 162 during only the second sweep of sector C, the innermost switch in switch set 161 is connected in series with switch set 162 and a tripdog is positioned in the innermost row of holes 150 within sector C to close the innermost switch when the tripdog is underneath it. A similar tripdog is positioned in the innermost row of holes 150 on the opposite side of the programming table to close the innermost switch again when the other external contour is being ground.

The use of a programming table permits adjustments in the position and/or speed of the grinding wheel to be programmed very easily and is very useful where each workpiece to be ground is different. For mass production, however, a computer is ordinarily used for most efficient production rates. In these circumstances, the functions of the programming table, tripdogs and switch sets can be attained by means for sensing the angular position of the worktable and means in the computer for producing an output signal in response to said detection.

Figure 4:
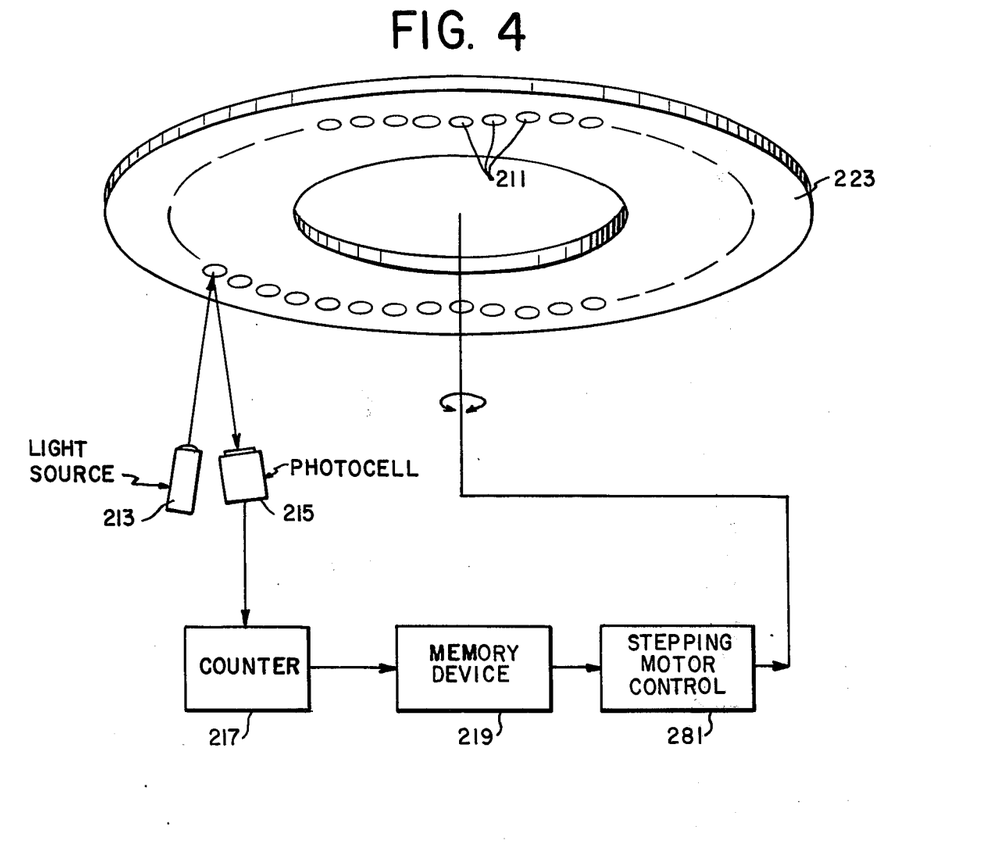
FIG. 4 is a schematic view of a preferred embodiment of the present invention.

Accordingly, in the preferred embodiment of the invention shown in FIG. 4, discrete light reflective spots 211 are positioned on the under side of support 223 which corresponds to support 23 of FIG. 1. Reflecting spots 211 can be small mirrors or even spots of reflective paint. The path defined by the reflecting spots is coincident with the projection onto the bottom surface of support means 223 of the contour being ground on workpiece 9. A light source 213 and a photocell 215 are mounted on a stationary portion of the grinding machine directly below the point of contact between the grinding wheel and the workpiece. Light source 213 is aimed at reflecting means 211 so that light from reflecting means 211 is incident on photocell 215. Photocell 215 produces an output pulse for each reflecting spot that passes before it. These output pulses are counted by a recycling counter 217. As will be evident, the function of counter 217 and memory device 219 can be readily attained by suitable programming of a digital computer. By counting reflections from reflecting means 211, counter 217 monitors the angular position of supporting means 223 and, therefore, the angular position of the workpiece attached thereto. With each complete revolution of supporting means 223 counter 217 is reset to zero by any one of a number of conventional means.

Memory 219 is essentially a look-up table which produces an output signal which varies in accordance with the count applied to its input. This output signal is then applied to a stepping motor control 281 that controls a stepping motor identical to stepping motor 39 of FIG. 1. This stepping motor controls the position of the grinding tool with respect to the workpiece. The output of memory device 219 may also be applied, alternatively or in addition, to a speed control for the motor that drives the grinding tool.

As will be evident, numerous changes may be made in the above described embodiments without departing from the spirit and scope of the invention. Other forms of programming tables, limit switches and angular position sensing means will be readily apparent to anyone skilled in the art. For example, in some applications, it may be desirable to eliminate the use of reflecting means by mouting several light sources on a moving portion of the grinding machine and moving them past a photocell in much the same way as reflecting means 211 are moved past light source 213 and photocell 215. It may also be desirable to sense the angular position of the workpiece by sensing the position of the cam that drives the worktable rather than the supporting means for the worktable. This can readily be done by sensing the position of the cam at the point of contact between the cam drive and the cam.

While work to date has indicated the advantages of controlling the speed and/or position of the grinding wheel in accordance with the angular position of the worktable, the speed of the worktable can also be readily controlled by controlling the speed of cam drive 2 of FIG. 1 and the lateral (i.e. vertical in FIG. 1) movement of the grinding wheel across the workpiece can also be readily controlled by controlling the speed of motor 43 shown in FIG. 3 of U.S. Pat. No. 3,663,188. Since it is likely that such control of the worktable speed or the lateral movement of the grinding wheel across the workpiece may also be useful in some instances, such applications are also intended to be within the spirit and scope of this invention.

What is claimed is:

1. In a grinding machine comprising a grinding tool, a worktable on which a workpiece may be mounted for grinding, means for feeding said grinding tool into said workpiece, and a cam and cam driver means for driving said worktable repeatedly through the same path, apparatus comprising:
   at least one sensing means,
   at least one means for triggering said sensing means to produce an output signal,
   a programming table rigidly connected to said worktable, one of said sensing means and said triggering means being selectively mounted on said programming table and the other being mounted in such a position that said sensing means is triggered whenever the one is moved past the other as a result of movement of the worktable through the path on which it is driven, and
   means for modifying at least one of the speed of the grinding tool, the position of the grinding tool, the lateral movement of the grinding tool across the workpiece, and the speed of the driving means in accordance with said output signal as the grinding tool is being fed into said workpiece.

2. The apparatus of claim 1 wherein said triggering means and said sensing means comprise a light source and a photodector.

3. The apparatus of claim 1 wherein said sensing means and triggering means comprise:
   a plurality of switches located adjacent the worktable,
   a plurality of switch tripping means, and
   means for producing an output that varies at any time with at least one of the number of switches tripped at that time or the position of the switches tripped at that time.

4. The apparatus of claim 3 wherein the position of the switches tripped is weighted in binary fashion.

5. The apparatus of claim 1 wherein the programming table has a series of holes arranged in a path similar in shape to the path through which the worktable is driven, said holes being adapted to mount either said sensing means or said triggering means.

6. The apparatus of claim 5 wherein the path through which the worktable is driven is an epitrochoid and the projection of said epitrochoid path onto the plane of the programming table is everywhere throughout said path parallel to the path defined by the holes in the programming table.

7. In a grinding machine comprising a grinding tool, a worktable on which a workpiece may be mounted for grinding, means for feeding said grinding tool into said workpiece, and means for driving said worktable repeatedly through the same epitrochoid path, apparatus comprising:
at least one sensing means,
at least one means for triggering said sensing means to produce an output signal,
a programming table connected to said worktable and having therein a series of holes arranged in a path similar in shape to the epitrochoid path through which the worktable is driven, the projection of said epitrochoid path onto the plane of the programming table being everywhere throughout said path parallel to the path defined by the holes in the programming table,
one of said sensing means and said triggering means being selectively mounted in at least one of said holes in said programming table and the other being mounted in such a position that said sensing means is triggered whenever the one is moved past the other as a result of movement of the worktable through the path on which it is driven, and
means for modifying at least one of the speed of the grinding tool, the position of the grinding tool, the lateral movement of the grinding tool across the workpiece, and the speed of the driving means in accordance with said output signal as the grinding tool is being fed into said workpiece.

8. The apparatus of claim 7 wherein said sensing means is a switch.

9. The apparatus of claim 8 wherein:
said sensing means further comprises a second switch, and
there is a second series of holes in the programming table, said second series of holes being positioned so that when at least one switch tripping means mounted in at least one hole in the first series of holes is in a position to engage said first switch at least one switch tripping means mounted in at least one hole in the second series of holes is in a position to engage said second switch.

10. The apparatus of claim 9 wherein said sensing means and said triggering means further comprise means to activate said second switch upon the activation of said first switch.

11. The apparatus of claim 9 wherein said second switch is located on the opposite side of the grinding machine from the first switch and in approximately the same plane as both said first switch and the point of contact between the grinding tool and the workpiece.

12. The apparatus of claim 9 wherein the second switches are electrically coupled in series with at least one first switch.

13. The apparatus of claim 9 wherein an output signal from said second switch is used to modify at least one of the speed of the grinding tool, the position of the grinding tool, the lateral movement of the grinding tool across the workpiece, and the speed of the grinding means during the grinding of an external contour of the epitrochoid.

14. The apparatus of claim 13 wherein an output signal from said first switch is used either to activate said second switch or to modify at least one of the speed of the grinding tool, the position of the grinding tool, the lateral movement of the grinding tool across the workpiece, and the speed of the grinding means during the grinding of an internal contour of the epitrochoid.

15. In a grinding machine comprising a grinding tool, a worktable on which a workpiece may be mounted for grinding, means for feeding said grinding tool into said workpiece, and means for driving said worktable repeatedly through the same path, apparatus comprising:
sensing means comprising a first plurality of sensors,
means for triggering said sensing means to produce an output signal, said means comprising a plurality of triggering devices,
a programming table connected to said worktable and having therein a first series of holes in the periphery of the programming table, said holes defining a first plurality of paths approximately parallel to one another,
one of said sensing means and said triggering means being selectively mounted in at least one of said holes in each path in said programming table and the other being mounted in such a position that said sensing means is triggered whenever the one is moved past the other as a result of movement of the worktable through the path on which it is driven, and
means for modifying at least one of the speed of the grinding tool, the position of the grinding tool, the lateral movement of the grinding tool across the workpiece, and the speed of the driving means in accordance with said output signal as the grinding tool is being fed into said workpiece.

16. The apparatus of claim 15 wherein each said sensor is a switch and each said triggering device is a switch tripping means.

17. The apparatus of claim 16 wherein the path through which the worktable is driven is an epitrochoid and the projection of said epitrochoid path onto the plane of the programming table is everywhere throughout said path parallel to each path defined by the holes in the programming table.

18. The apparatus of claim 17 wherein:
said sensing means further comprises a second plurality of switches, and
there is a second series of holes defining a plurality or rows of holes in the programming table, said second series of holes being positioned so that when at least one switch tripping means mounted in at least one hole in the fifth series of holes is in a position to engage at least one of the first plurality of switches at least one switch tripping means mounted in at least one hole in the second series of holes is in a position to engage at least one of the second plurality of switches.

19. The apparatus of claim 18 wherein the sensing means and said triggering means further comprise means to activate said second plurality of switches upon the activation of at least one switch in said first plurality of switches.

20. The apparatus of claim 18 wherein said second plurality of switches is located on the opposite side of the grinding machine from the first plurality of switches and in approximately the same plane as both said first plurality of switches and the point of contact between the grinding tool and the workpiece.

21. The apparatus of claim 20 wherein the epitrochoid path through which the worktable is driven has at least one external contour and at least some of the holes in said second series of holes are positioned on the opposite side of said programming table from said external contour.

22. The apparatus of claim 18 wherein the second switches are electrically coupled in series with at least one first switch.

23. The apparatus of claim 18 wherein an output signal from said second plurality of switches is used to modify at least one of the speed of the grinding tool, the position of the grinding tool, the lateral movement of the grinding tool across the workpiece, and the speed of the grinding means during the grinding of an external contour of the epitrochoid.

24. The apparatus of claim 23 wherein an output signal from said first plurality of switches is used either to activate said second plurality of switches or to modify at least one of the speed of the grinding tool, the position of the grinding tool, the lateral movement of the grinding tool across the workpiece, and the speed of the grinding means during the grinding of an internal contour of the epitrochoid.

25. The apparatus of claim 15 wherein the holes in said programming table are arranged in as many paths as there are sensors.

26. In a grinding machine comprising a grinding tool, a worktable on which a workpiece may be mounted for grinding, means for feeding said grinding tool into said workpiece, and means for driving said worktable repeatedly through the same path, apparatus comprising:
   a first plurality of sensing means,
   means for simultaneously triggering said plurality of sensing means to produce an output signal that is a function of the number and/or position of the sensing means triggered,
   means for connecting either said sensing means or said triggering means to a movable portion of the grinding machine and for positioning the other such that a signal is triggered when the one is moved past the other, and
   means for modifying at least one of the speed of the grinding tool, the position of the grinding tool, the lateral movement of the grinding tool across the workpiece, and the speed of the driving means in accordance with said output signal as the grinding tool is being fed into said workpiece.

27. The apparatus of claim 26 further comprising a second plurality of sensing means and a plurality of triggering means, said first and second pluralities of sensing means and said plurality of triggering means being connected and positioned such that when at least one triggering means is in a position to engage at least one of the first plurality of sensing means at least one other triggering means is in a position to engage at least one of the second plurality of sensing means.

28. The apparatus of claim 27 wherein the worktable is driven through a closed path and the second plurality of sensing means is located on the opposite side of the grinding machine from the first plurality of sensing means and in approximately the same plane as both said first plurality of sensing means and the point of contact between the grinding tool and the workpiece.

29. The apparatus of claim 27 wherein:
   the path through which the worktable is driven is an epitrochoid,
   an output signal from said second plurality of sensing means is used to modify at least one of the speed of the grinding tool, the position of the grinding tool, the lateral movement of the grinding tool across the workpiece, and the speed of the grinding means during the grinding of an external contour of the epitrochoid, and
   an output signal from said first plurality of sensing means is used either to activate said second plurality of sensing means or to modify at least one of the speed of the grinding tool, the position of the grinding tool, the lateral movement of the grinding tool across the workpiece, and the speed of the grinding means during the grinding of an internal contour of the epitrochoid.

30. The apparatus of claim 26 wherein the position of the sensing means that are triggered is weighted in binary fashion.

31. The apparatus of claim 26 wherein each sensing means is a switch.

* * * * *

UNITED STATES PATENT AND TRADEMARK OFFICE
CERTIFICATE OF CORRECTION

PATENT NO. : 4,005,552
DATED : February 1, 1977
INVENTOR(S) : Nils O. Hoglund and Carl Hoglund It is certified that error appears in the above-identified patent and that said Letters Patent are hereby corrected as shown below:

Column 1, line 35, "contacts area" should read --contact area--.

Column 3, line 55, "programmed" should read --programming--.

Column 4, line 7, "row A" second occurrence should read --row a--.

Column 6, line 8, "mouting" should read --mounting--.

Column 8, line 60, "fifth" should read --first--.

Signed and Sealed this

Twenty-fourth Day of May 1977

[SEAL]

Attest:

RUTH C. MASON
Attesting Officer

C. MARSHALL DANN
Commissioner of Patents and Trademarks